United States Patent
Shashanka et al.

(10) Patent No.: US 12,407,691 B1
(45) Date of Patent: Sep. 2, 2025

(54) METHODS AND SYSTEMS FOR OPTIMIZING GROUPING FOR ENHANCED ACCESS CONTROL AND RISK MITIGATION IN AN ENTERPRISE

(71) Applicant: Concentric Software, Inc., San Mateo, CA (US)

(72) Inventors: Madhusudana Shashanka, Austin, TX (US); Bonnie Arogyam Varghese, Milpitas, CA (US); Leomart Crisostomo, Sunnyvale, CA (US); Shankar Subramaniam, Cupertino, CA (US); Sumeet Khirwal, Jamshedpur (IN)

(73) Assignee: CONCENTRIC SOFTWARE, INC., San Mateo, CA (US)

(*) Notice: Subject to any disclaimer, the term of this patent is extended or adjusted under 35 U.S.C. 154(b) by 0 days.

(21) Appl. No.: 18/964,189

(22) Filed: Nov. 29, 2024

(51) Int. Cl.
*G06F 21/00* (2013.01)
*H04L 9/40* (2022.01)

(52) U.S. Cl.
CPC ......... *H04L 63/104* (2013.01); *H04L 63/101* (2013.01)

(58) Field of Classification Search
CPC ........................... H04L 63/104; H04L 63/101
See application file for complete search history.

(56) References Cited

U.S. PATENT DOCUMENTS

| | | | |
|---|---|---|---|
| 9,105,000 B1* | 8/2015 | White | G06F 16/244 |
| 9,641,334 B2* | 5/2017 | Faitelson | G06F 9/468 |
| 12,045,259 B2* | 7/2024 | Chaturvedi | G06F 7/08 |
| 2010/0131896 A1* | 5/2010 | Fitzmaurice | G06T 19/00 715/811 |
| 2015/0052097 A1* | 2/2015 | Song | G06N 20/00 706/52 |
| 2017/0351436 A1* | 12/2017 | Holt | G06F 16/27 |
| 2020/0167485 A1* | 5/2020 | Gupta | G06F 16/24573 |
| 2020/0174982 A1* | 6/2020 | Jones | G06F 16/252 |
| 2022/0391417 A1* | 12/2022 | Prentice | G06F 16/283 |

* cited by examiner

*Primary Examiner* — Kendall Dolly
(74) *Attorney, Agent, or Firm* — Evergreen Valley Law Group; Kanika Radhakrishnan

(57) ABSTRACT

Methods and systems for optimizing grouping for enhanced access control and risk mitigation. The method includes obtaining user data including data associated with a plurality of users and a plurality of groups, and access data including data associated with a plurality of data objects and corresponding access information. The method includes determining a first mapping information between each of the plurality of groups with corresponding users of the plurality of users based on the user data, and determining a second mapping information between each of the plurality of data objects with corresponding users of the plurality of users based on the access data. The method includes generating a cluster dataset representing a plurality of clusters based at least on processing of a relational structure between the first mapping information and the second mapping information. The plurality of clusters represent newly generated groups of the plurality of users.

20 Claims, 7 Drawing Sheets

METHODS AND SYSTEMS FOR OPTIMIZING GROUPING FOR ENHANCED ACCESS CONTROL AND RISK MITIGATION IN AN ENTERPRISE

TECHNICAL FIELD

The present invention relates to enterprise security management and more particularly to methods and systems for optimizing user grouping to enhance access control and mitigate security risks in large enterprises.

BACKGROUND

Enterprises typically rely on security groups to manage and control access to sensitive documents, files, and other resources. These security groups often correspond to specific departments, roles, or functions within the enterprise. These groups are then assigned permissions to access certain sets of documents or resources, ensuring that all members of the group have the necessary access to perform their roles. This method simplifies access control by allowing administrators to manage permissions at the group level, rather than for each individual user.

However, as enterprises grow, the number of security groups can proliferate, increasing the complexity of managing access rights and ensuring the proper protection of sensitive information. The proliferation of redundant groups increases the threat surface. The ever-increasing volume of documents generated within enterprises presents a significant challenge for security teams. In medium to large enterprises, it is not uncommon to find tens of thousands of security groups, each with varying degrees of access to resources. One of the primary challenges in managing security groups is the potential impact on business continuity when changes are made. Removing users from security groups or eliminating groups can disrupt access to critical resources, hindering employees from performing their job functions. This risk makes enterprises cautious about modifying or streamlining group configurations, even when outdated or redundant groups are identified.

The accumulation of security groups, many of which may be obsolete or grant excessive or unnecessary permissions, introduces significant security risks for enterprises. Permissions are frequently granted in an ad hoc manner, with little consideration for ongoing validation or periodic review. As users gain access to resources beyond what is required for their roles, the enterprise becomes more vulnerable to security threats. It provides malicious entities with more opportunities to exploit excessive or unmonitored permissions, potentially leading to unauthorized access, data breaches, and other security incidents.

Hence, there exists a technological need for more efficient methods and systems to efficiently optimize security group configurations, streamline access control, and reduce the enterprise's risk surface.

SUMMARY

Various embodiments of the present disclosure provide methods and systems for user grouping to enhance access control and mitigate security risks within an enterprise.

In an embodiment, a computer-implemented method is disclosed. The computer-implemented method performed by a server system includes obtaining user data, where the user data includes data associated with a plurality of users and a plurality of groups. Each of the plurality of users is associated with at least one group of the plurality of groups. The user data specifies a group membership of each of the plurality of users and one or more of the plurality of groups. The method includes obtaining access data, where the access data includes data associated with a plurality of data objects and corresponding access information. The access information specifies a set of users or groups, from the plurality of users or the plurality of groups respectively, authorized to access each respective data object of the plurality of data objects. The method includes determining a first mapping information between each of the plurality of groups with corresponding users of the plurality of users based on the user data. The method includes determining a second mapping information between each of the plurality of data objects with corresponding users of the plurality of users based at least on the access data. The method includes generating a cluster dataset representing a plurality of clusters based at least on processing of a relational structure between the first mapping information and the second mapping information. The plurality of clusters represent newly generated groups of the plurality of users. Each user in the plurality of clusters has a same access authorization for the plurality of data objects as assigned within the plurality of groups. A number of the plurality of clusters is less than a number of the plurality of groups.

In another embodiment, a server system is disclosed. The server system includes a memory configured to store instructions, a communication interface, and a processor configured to execute the instructions stored in the memory and thereby causing the server system to obtain user data, where the user data includes data associated with a plurality of users and a plurality of groups. Each of the plurality of users is associated with at least one group of the plurality of groups. The user data specifies a group membership of each of the plurality of users and one or more of the plurality of groups. The server system is also caused to obtain access data, where the access data includes data associated with a plurality of data objects and corresponding access information. The access information specifies a set of users or groups, from the plurality of users or the plurality of groups respectively, authorized to access each respective data object of the plurality of data objects. The server system is also caused to determine a first mapping information between each of the plurality of groups with corresponding users of the plurality of users based on the user data. The server system is also caused to determine a second mapping information between each of the plurality of data objects with corresponding users of the plurality of users based at least on the access data. The server system is also caused to generate a cluster dataset representing a plurality of clusters based at least on processing of a relational structure between the first mapping information and the second mapping information. The plurality of clusters represent newly generated groups of the plurality of users. Each user in the plurality of clusters has a same access authorization for the plurality of data objects as assigned within the plurality of groups. A number of the plurality of clusters is less than a number of the plurality of groups.

The generation of the cluster dataset reduces the number of plurality of groups while each user in the plurality of clusters having the same access authorization for the plurality of data objects as assigned within the plurality of groups, thereby optimizing grouping for enhanced access control and risk mitigation.

BRIEF DESCRIPTION OF THE FIGURES

For a more complete understanding of example embodiments of the present technology, reference is now made to the following descriptions taken in connection with the accompanying drawings in which.

Figure 1:
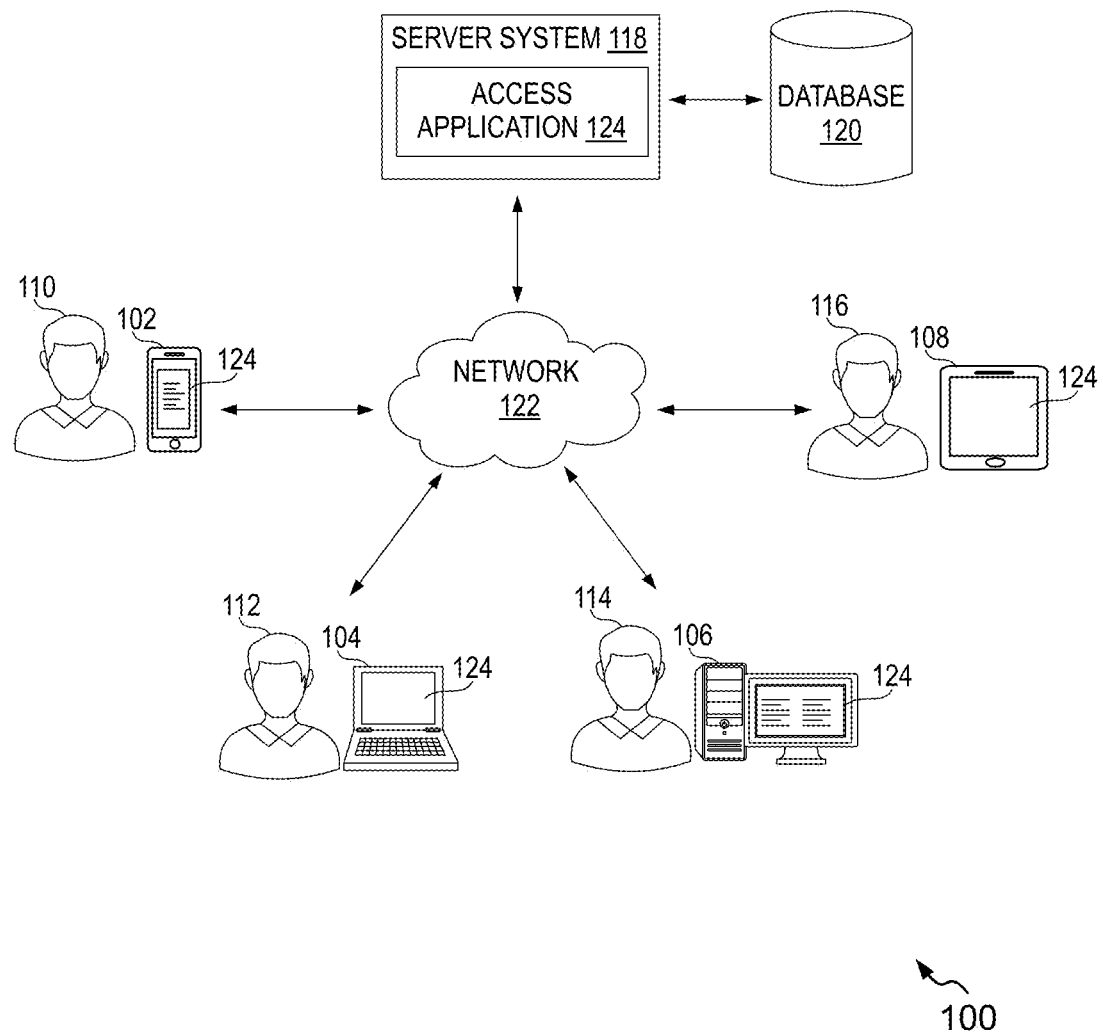
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "data object", "document", "file", and "electronic document" may have been used interchangeably throughout the description. Unless the context suggests otherwise, these terms refer to a digital file that contains information formatted for electronic storage, retrieval, and display on various output devices such as computer, etc.

Unless the context suggests otherwise, the term "group membership" refers to the association or inclusion of an entity, such as a user or a group within another group. This group is typically governed by common characteristics, access permissions, roles, or responsibilities, allowing for collective management, access control, or interaction within a specified domain.

Overview

Various example embodiments of the present disclosure provide methods and systems for grouping for enhanced access control and risk mitigation in an enterprise. In particular, a unique approach is proposed for re-grouping the plurality of users within an enterprise while retaining the existing user permissions or authorized access to data objects. The proposed methods and systems optimize the user grouping to enhance access control and mitigate risks associated. In particular, the system analyzes the existing grouping structure and composition of security groups and their associated permissions within an enterprise, identifying redundant, obsolete, or overly permissive groups and generating a new set of groups, i.e., optimizing the existing groups for efficient access control.

The proposed system creates a smaller set of new groups to replace all the existing groups. In this process of creating a smaller set of groups, each existing group membership should be able to be reconstructed as a linear combination of the newly created groups. In other words, the existing groups can be presented as a linear combination of newly formed groups.

Thus, the proposed system optimizes the grouping by determining a smaller set of "basis group permissions" when provided a set of groups with associated permissions, where every input group's permission can be recreated from a combination of the basis groups. This maintains business continuity by ensuring that no user will lose any access to any file they have permissions to with the existing groups.

Various embodiments of the present disclosure offer multiple advantages and technical effects. For instance, the proposed invention offers several significant advantages, particularly in the context of risk management and access control of files within an enterprise. One of the primary benefits is the ability to optimize security group configurations, so that enterprises can significantly reduce their exposure to potential threats.

In particular, the proposed invention simplifies the management of user access within an organization by effectively reducing the number of user groups while keeping the changes to user access to the data objects minimal. In large enterprises, it is common for security groups to proliferate over time, leading to a complex and unwieldy structure. Managing these numerous groups can become cumbersome, with overlapping permissions and unnecessary redundancies, making it difficult for administrators to monitor access control effectively. The invention optimizes this structure by identifying opportunities to consolidate groups based on user access patterns and permissions, thereby reducing the total number of groups while maintaining the same level of access control.

By minimizing the number of groups, the invention allows for easier management of user permissions and access policies. Instead of dealing with an overwhelming number of distinct groups, administrators can manage a streamlined set of well-organized groups that are more aligned with the actual access needs of the organization. Additionally, with fewer groups, changes in user roles or access requirements can be implemented more efficiently, saving time and resources within the enterprise. Overall, this reduction in the effective number of user groups improves both security and operational efficiency. Optimizing group structures facilitates minimizing unnecessary permissions and ensuring that users have access only to the resources essential for their roles, thereby decreasing the risk of unauthorized access and data breaches.

Further, optimizing security groups while maintaining existing user permissions offers a significant advantage in ensuring the continuity of business activities within an organization. By streamlining security group management without altering user access rights, enterprises can enhance operational efficiency and stability. It ensures uninterrupted access to the files managing security group changes, thereby ensuring the continuity of business activities. By adopting a structured approach to modifying group memberships, organizations can prevent disruptions in access to critical documents, ensuring that employees can continue to perform their jobs effectively.

Various embodiments of the methods and systems for optimizing user grouping are described hereinafter with reference to FIG. 1 to FIG. 7.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, the way in which a server system 118 (interchangeably referred to as "system 118") facilitates optimizing the user grouping for enhanced access control within the enterprise. The example representation of the environment 100 generally includes a plurality of user devices 102, 104, 106, and 108 associated with a plurality of users 110, 112, 114, and 116, a server system 118, and a database 120 connected to, and in communication with (and/or with access to) a wireless communication network (e.g., a network 122). The plurality of users are associated with an enterprise.

In the illustrated environment 100, the plurality of user devices 102-108 are depicted as a mobile phone, a laptop, a desktop computer, and a tablet respectively. However, the plurality of user devices 102-108 may include any other suitable electronic or computing device as well. For instance, the computing device may be, for example, a smartphone, a personal computer, an electronic tablet, a wearable device, a smart device such as a smart TV or smart appliance, etc.

In one example, the plurality of users 110-116 may access a set of data objects such as documents or files through the associated user devices 102-108. The server system 118 allows the plurality of users 110-116 to input user credentials for authorizing the user to access the set of data objects. The server system 118 may act as a central authority responsible for managing access to these resources. In this case, two-step authorization can be performed. In the first step, each user must provide their credentials (such as usernames, passwords, or other authentication methods). The server system 118 checks these credentials to authenticate the user's identity. Once the users 110-116 are authorized, the server system 118 moves on to a second step to determine the access permissions granted to the users 110-116. These permissions define what each user can do within the system, such as viewing, editing, or downloading specific documents or files. The system 118 assesses the user's profile, group membership, or other authorization parameters to decide whether the user is permitted to access the requested data objects. This process ensures that the right users are allowed to perform the correct actions based on predefined rules set by administrators.

Based on the access permissions, if the user's access permissions meet the required level for the documents or data they are trying to access, the system 118 grants access, allowing the user to proceed with viewing or interacting with the files. However, if the permissions are insufficient—for instance, if the user is not part of a security group that has access to the requested files, the system 118 denies the request. This denial ensures that unauthorized users cannot reach restricted or sensitive data, reinforcing the organization's security policies. Thus, the server system can control the access to the data objects while optimizing the grouping of the users within the enterprise.

In another embodiment, the server system 118 responsible for optimizing security groups can work in tandem with an access control server (not shown) that manages and controls actual access to data objects, such as documents or files. In this case, the server system 118 focuses on analyzing and reorganizing the security groups of users with specific access permissions. The system 118 ensures that the security groups are efficient and up to date, removing redundant groups or refining existing ones to minimize risk and maintain clear, manageable access structures. The server system 118 does not directly grant or deny access but improves the overall structure of user permissions by keeping the security groups streamlined. The optimization is performed automatically and continuously to ensure that user permissions are accurate, without disrupting existing business operations or user access.

Meanwhile, the access control server is the system responsible for enforcing the actual access permissions. By separating the roles of group optimization and access control between two servers, the enterprise can maintain security while ensuring operational efficiency. The server system 118 continuously improves the structure and integrity of the groups, ensuring users are in the appropriate groups based on their roles and responsibilities. Meanwhile, the access control server focuses purely on enforcing these permissions in real-time, ensuring that users have the correct level of access without being affected by the backend optimization processes.

In this manner, security groups remain optimized without causing disruptions to users' work. Employees continue to access the documents they need, while the underlying security structure remains efficient and risk-free, enhancing both security and operational continuity in the enterprise. This entire process occurs seamlessly and in real-time, ensuring that users can access necessary resources immediately if authorized, while also preventing unauthorized access. By managing access based on each user's credentials and permissions, the server system 118 ensures both security and efficiency in the handling of sensitive documents, safeguarding the organization's data integrity and compliance with security protocols.

It should be noted that the number of users and user devices described herein are only used for exemplary purposes and do not limit the scope of the invention. The main objective of the invention is to optimize user grouping to enhance access control and mitigate security risks in large organizations.

The server system 118 may be deployed as a standalone server or can be implemented in the cloud as software as a service (SaaS). The server system 118 provides or hosts an access application 124 for enabling the plurality of users 110, 112, 114, and 116 to provide access to the set of data objects within large data object collections. For example, the access application 124 may be a mobile application, a desktop application, a website, or a plugin in a third-party application. For example, the third-party application may be any existing access application facilitating the execution of tasks similar to that performed by the server system 118. In some embodiments, the access application 124 can be implemented as operating system extensions, modules, plugins, and the like. Further, the access application 124 may be operative in a cloud infrastructure, or the access application 124 may be executed within or as a virtual machine (VM) or virtual server that may be managed in the cloud infrastructure.

The server system 118 is embodied in at least one computing device in communication with the network 122 and/or embodied in at least one non-transitory computer-readable media. For example, an instance of the access application 124 is accessible to the user devices 102-108, as shown in the environment 100 in FIG. 1. This enables the plurality of users 110-116 to be able to access the server system 118 on the user devices 102-108. The access application 124 is a set of computer-executable codes configured to provide user interfaces (UIs) enabling the plurality of users 110-116 to get access to a set of data objects under the two-step authorization for the request to access the data objects. In an embodiment, the server system 118 may provide access to the data objects through the access application 124, in response to a request received from the user devices 102-108 via the network 122. In another embodiment, the access application 124 may be factory-installed on the user devices 102-108.

The network 122 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 122 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, any future communication protocol, or any combination thereof. The network 122 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 122 may include multiple different networks, such as a private network made accessible by the user devices 102-108, the server system 118, and the database 120 separately, and/or a public network (e.g., the Internet) through which the user devices 102-108, the server system 118, and the database 120 may communicate.

In one embodiment, the server system 118 is configured to perform one or more of the operations described herein. In particular, the server system 118 is configured to obtain access data and user data for optimizing the grouping of the users. The user data may include data associated with a plurality of users and a plurality of groups, where each user is associated with at least one group. In other words, the user data refers to information about the users in the system and the groups to which they belong. The user data also specifies a group membership of each user and a few of the groups as each user belongs to at least one group, however, a group may or may not belong to another group.

The user data typically includes a list of users within the enterprise. This list can include basic information such as user IDs, names, job roles, departments, and possibly their locations. Example: John Doe (user ID 1234), Jane Smith (user ID 5678). Each user is associated with one or more security groups (interchangeably referred to as "groups") and the group can be associated with other groups. The server system 118 collects information on all existing groups within the enterprise, including group names, descriptions, and the users that belong to each group.

In an embodiment, the server system 118 is also configured to obtain access data for optimizing the grouping of the users. The access data includes data associated with a plurality of data objects and corresponding access information. The access information (interchangeably referred to as "user permissions", "access permissions" or "permissions") specifies a set of users or groups, from the plurality of users or the plurality of groups, authorized to access each respective data object of the plurality of data objects. Thus, the access information specifies a set of users/groups for each data object. The access data refers to the data objects such as documents, files, or systems within the enterprise and the access information associated with each data object. This data helps determine which users or groups have access to specific resources. The data object can be resources that users attempt to access such as files, databases, applications, or specific documents within a company's network.

The access data may include access information or access permission that specifies which users or groups have permission to access the data object to view, edit, or manage the object. The access information can also include information about how and when users or groups have accessed specific data objects. Access logs are important for tracking user activity and identifying patterns that can optimize groupings. Example: John Doe accessed the budget report on July 15, but Jane Smith hasn't accessed any files for 6 months.

In an embodiment, the access information may include Access Control Lists (ACLs) that define permissions for each object. An ACL can indicate which users or groups are granted access to certain files.

The server system 118 may obtain the user data and access data in structured format such as XML or JSON format. In another embodiment, the user data and the access data can be obtained in Comma-separated values (CSV), Structured Query Language (SQL), or Excel format.

The user data and the access data can be obtained in various ways. For instance, the server system 118 can be configured to interact with other systems and databases through application programming interfaces (APIs). This integration allows the server to automatically fetch user data and access data from external sources such as enterprise content management systems, cloud storage services, or document repositories. In another example, the server system 118 can fetch the data directly from the database 120. In another example, the server system 118 can employ web crawling techniques to gather data from specific websites or intranets. In another example, the server system 118 can use stream processing to continuously ingest documents from real-time data streams. This approach is suitable for scenarios where documents are generated continuously and need to be processed on-the-fly.

Thus, the server system 118 is configured to obtain the user data and the access data, and based on these data, the server system 118 can be configured to determine the mapping among users, groups, and data objects. The server system 118 may determine a first mapping information between each of the plurality of groups with corresponding associated users of the plurality of users based on the user data. In particular, the server system 118 may analyze the group memberships of users and groups to determine the structure of user groups to better understand how users are organized. The first mapping information can indicate mapping between a group to all users who belong in the group or who belong in groups that belong in that group. The server system 118 may determine how users are linked to groups based on the user data. Example: John Doe is part of the "Finance" group, while Jane Smith is part of the "Engineering" group.

The first mapping information unrolls the direct relationship between the users and groups. For example, if group B is a subset of group A, then first mapping information can indicate mapping between the users of both groups A & B with group A, and mapping between users of group B with group B.

In an embodiment, the server system 118 may also determine a second mapping information between each of the plurality of data objects with corresponding associated users of the plurality of users based at least on the access data. In some embodiments, the server system 118 may use user data to determine the second mapping information. The system retrieves a comprehensive list of data objects including all files and folders within the enterprise. This includes understanding the hierarchy and structure of these files, such as folders containing subfolders or documents. For each file or folder, the corresponding access permissions are examined. This includes who has access (users and groups) and what type of access they have (read, write, delete).

Upon determination of the first mapping information and the second mapping information, the server system 118 may generate a cluster dataset representing a plurality of clusters based at least on processing of a relational structure between the first mapping information and the second mapping information. The plurality of clusters represent newly generated groups of the plurality of users. Each user in the plurality of clusters has a same access authorization for the plurality of data objects as assigned within the plurality of groups.

The number and arrangement of systems, devices, and/or networks shown in FIG. 1 are presented as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device is shown in FIG. 1 may be implemented as multiple, distributed systems or devices. In addition, the system 118 should be understood to be embodied in at least one computing device in communication with the network 122, which may be specifically configured, via executable instructions, to perform steps as described herein, and/or embodied in at least one non-transitory computer-readable media.

Figure 2:
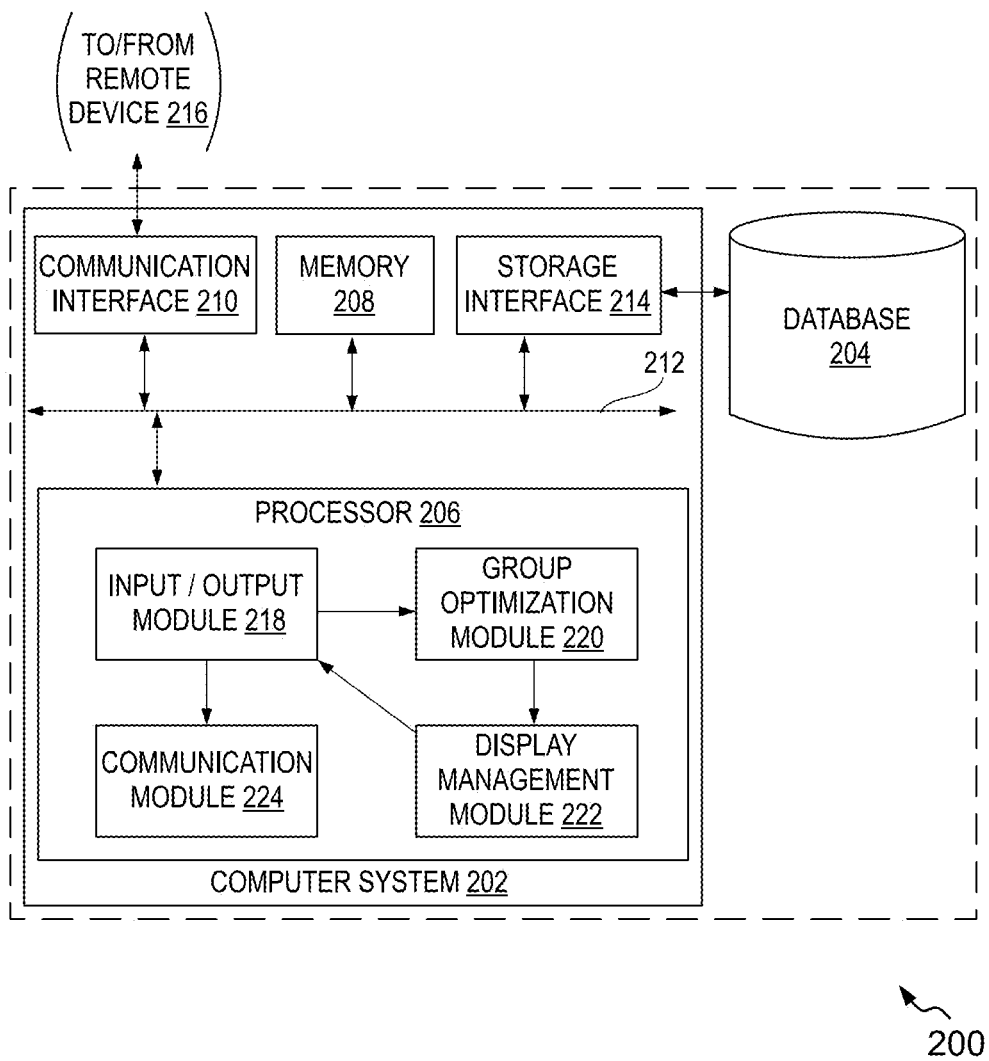
FIG. 2 is a simplified block diagram representation of a server system, in accordance with an embodiment of the present disclosure.

FIG. 2 is a simplified block diagram representation of a server system 200, in accordance with an embodiment of the present disclosure. The server system 200 is an example of the server system 118 depicted in FIG. 1. In some embodiments, the server system 200 is embodied as a cloud-based and/or SaaS-based (software as a service) architecture. The server system 200 is configured to facilitate optimizing the grouping of the users for enhanced control access and risk mitigation.

The server system 200 includes a computer system 202 and a database 204. The database 204 is an example of the database 120 of FIG. 1. The computer system 202 includes at least one processor 206 (hereinafter referred to as "processor") for executing instructions, a memory 208, a communication interface 210, and a storage interface 214 that communicate with each other via a bus 212.

In some embodiments, the database 204 is integrated into the computer system 202. For example, the computer system 202 may include one or more hard disk drives as the database 204. In one embodiment, the database 204 is integrated within the computer system 202 and configured to store an instance of the access application 124. Further, the storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions for performing one or more operations for optimizing user grouping within an enterprise. Examples of the processor 206 include but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include but are not limited to, a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as the user devices 102-108, or with any entity connected to the network 122 (as shown in FIG. 1). In an embodiment, the processor 206 is configured to facilitate the access application 124 on the user devices 102-108 for enabling a plurality of functionalities to the devices described in the disclosure.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

Further, in an embodiment, the server system 200 includes an input/output (I/O) module 218, a group optimization module 220, a display management module 222, and a communication module 224. It should be noted that components, described herein, can be configured in a variety of ways, including electronic circuitries, digital arithmetic and logic blocks, and memory systems in combination with software, firmware, and embedded technologies. For example, the modules 218, 220, 222, and 224 can be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The I/O module 218 is configured to receive the user data and the access data associated with an enterprise. For instance, I/O module 218 receives the user data and access data, associated with users, groups, and data objects. The user data may include data associated with a plurality of users and a plurality of groups, where each user is associated with at least one group. The access data may include a plurality of data objects and corresponding access information. The data object can include an executable file or non-executable file, including a plurality of contents such as but not limited to, text, images, audio, video, animations, and the like.

Upon receipt of the user data and the access data, the group optimization module 220 may be configured to determine a first mapping information between each of the plurality of groups with corresponding associated users of the plurality of users based on the user data. The first mapping information transforms the complex group-to-group and group-to-user relationships into direct user-group relations by rolling the group membership so as to reduce the complexity of access control operations. This transformation enhances data retrieval efficiency by removing redundant group hierarchies. In addition, the group optimization module 220 may be configured to determine a second mapping information between each of the plurality of data objects with corresponding associated users of the plurality of users based on the access data. In an embodiment, the user data may be utilized for determination of the first mapping information, whereas the access data may be utilized for determination of the second mapping information. In some embodiment, the user data along with the access data may be utilized for determination of the second mapping information.

These mappings (i.e., first and second mapping information) optimize the user-group relations and user-data objects relations, which reduces computational overhead during access control checks and minimizes the processing resources needed to manage group membership across multiple levels.

In an embodiment, the group optimization module 220 may generate a hypergraph based on the user data and the access data. The hypergraph is a data structure that includes a set of vertices (or nodes) and a set of edges connecting the nodes. In this case, the plurality of users, plurality of groups, and plurality of data objects can be represented as nodes of the hypergraph as shown in FIG. 4. Further, the relation between these nodes can be represented through edges based on the user data and access data. For example, a group node may be connected to all the users within the group and users who belong to the groups within the group. The edges between the users and group can be referred to as membership edges, which can indicate a first mapping information between each of the plurality of groups with corresponding associated users of the plurality of users. The membership edge can be set based on the user data.

Similarly, the data object node may be connected to all the users that can access the data object, via edges. The edge between the user and the data object can be referred to as permission edges, which can indicate a second mapping information between each of the plurality of data objects with corresponding associated users of the plurality of users.

Thus, the group optimization module 220 may use the hypergraph to identify the relationship between the users and groups, and the relationship between the users and the data objects. Thus, the hypergraph indicates a direct relationship among users, groups, and data objects. Based on the user data, the group optimization module 220 may use these relationships to compute a first mapping information, i.e., direct relationship or association between the users and groups, which indicates which user belongs to which group. For example, the user data indicates that user A belongs to group G1, and group G1 is a subset of group G2. In this case, the first mapping information establishes a direct relationship between user A and group G2.

In addition to the computation of the first mapping information, the group optimization module may compute the second mapping information based on the access data. The second mapping information indicates which user has access to which object. In some embodiments, the second mapping information may be computed based on user data along with the access data. For example, user A belongs to group G1, and group G1 is a subset of group G2. In this case, the second mapping information establishes a direct relationship between user A and data objects of groups G1 and G2.

In order to determine the first mapping information and the second mapping information, a subgraph may be selected from the hypergraph. A subgraph refers to a smaller, more specific subset of the larger hypergraph, containing some of the original vertices and edges. In order to determine the first mapping information or the user-group mapping, a subgraph may be selected within the hypergraph, which, for example, represents a subset of users belonging to a specific group, as well as the relationships (edges) between them as shown in FIG. 4B. Thus, for each of the plurality of groups, one subgraph may be retrieved from the hypergraph, and membership edges in the corresponding subgraph indicate the users associated with the group, thereby determining the first mapping information.

Figure 4A:
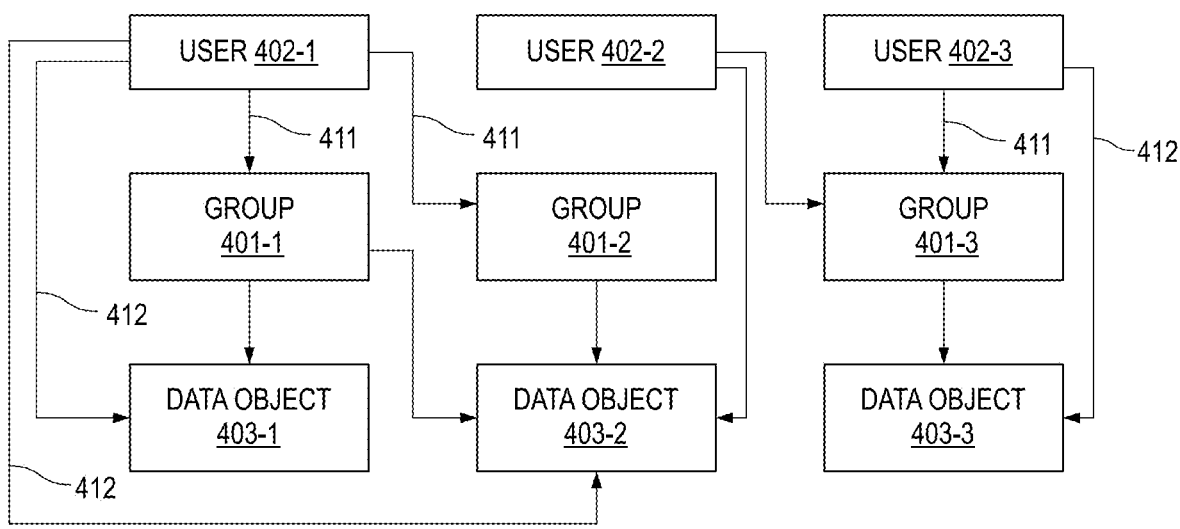
FIG. 4A illustrates a graphical representation of a hypergraph generated based on the user data and the access data, in accordance with embodiments of the present disclosure.
Figure 4B:
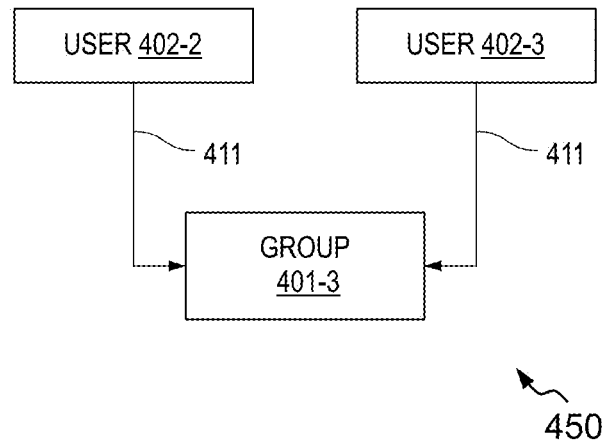
FIGS. 4B-4C illustrate graphical representations of subgraph generated based on the hypergraph of FIG. 4A, in accordance with embodiments of the present disclosure.
Figure 4C:
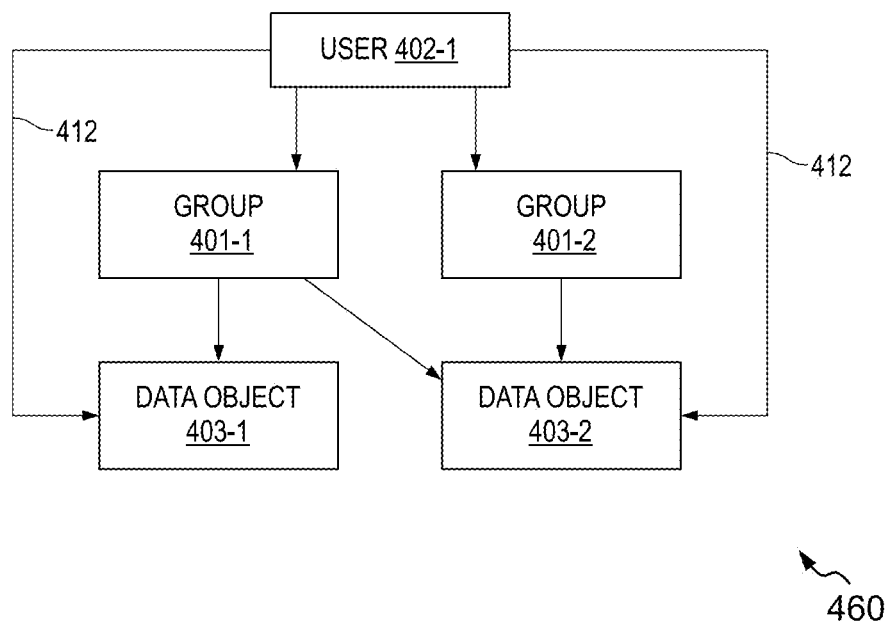

In the same manner, to determine the second mapping information, i.e., user-data object mapping, a subgraph may be selected within the hypergraph, which, for example, represents a subset of data objects accessible to a specific user, as well as the relationships (edges) between them as shown in FIG. 4C. Thus, for each of the plurality of users, one subgraph may be retrieved from the hypergraph, and permission edges in the corresponding subgraph indicate the data objects associated with the user, thereby determining the second mapping information.

In an embodiment, based on the first mapping information, i.e., mapping between the users and groups; and second mapping information, i.e., mapping between the data objects and the users, the group optimization module 220 may generate a cluster dataset representing a plurality of clusters based at least on processing of a relational structure between the first mapping information and the second mapping information. The plurality of clusters represent newly generated groups of the plurality of users. Each user in the plurality of clusters has a same access authorization for the plurality of data objects as assigned within the plurality of groups. Thus, the generation of the cluster dataset optimizes the grouping of the users within the enterprise. In other words, based on the first mapping information and the second mapping information, the group optimization module 220 regenerates the group structure by processing a relational structure between the first mapping and the second mapping. Thus, the plurality of clusters are generated that replaces the existing group structure while maintaining the same access formation for each of the plurality of the users. There are two ways to generate a cluster dataset based on the first mapping information and the second mapping information.

Method-I

In an embodiment, in order to generate the cluster dataset representing a plurality of clusters based at least on the first mapping information and the second mapping information, the group optimization module 220 may generate a first matrix representing the first mapping information between each of the plurality of groups with corresponding users of the plurality of users. The rows of the first matrix represent the plurality of users and the columns of the first matrix represent the plurality of groups. The first matrix can be represented as a binary matrix, where the relationship between a user and a group is indicated by either 1 or 0. If the user is part of the group, the corresponding cell in the first matrix is assigned a value of 1. If the user does not belong to the group, the cell value is 0. The first matrix is an adjacency matrix representing group membership information, i.e., all the users associated with each group. If user "i" is a member of group "j", the entry in the matrix at row "i" and column "j" will be set to 1, otherwise it will be set to 0. Let us call this matrix X, say with "m" rows and "n" columns.

$$X = \begin{pmatrix} \cdots \\ \vdots & \vdots \\ \cdots \end{pmatrix} m \times n \quad (1)$$

Once the first matrix is generated, the group optimization module 220 may generate a cluster dataset including a second matrix (W) and a third matrix (H) such that the first matrix is the multiplication of the second and the third matrixes. The rows of the second matrix represent the plurality of users i.e. each row corresponds to a user, whereas the number (n) of columns in the third matrix represents the number of plurality of groups.

$$W = \begin{pmatrix} \cdots \\ \vdots & \vdots \\ \cdots \end{pmatrix} m \times k \quad (2)$$

$$H = \begin{pmatrix} \cdots \\ \vdots & \vdots \\ \cdots \end{pmatrix} k \times n \quad (3)$$

$$X = W \cdot H \quad (4)$$

The second matrix (W) and the third matrix (H) are also binary matrixes. The number of columns of the second matrix (W) is equal to the number of rows of the third matrix (H), which represents a number (k) of plurality of clusters.

Here, k presents the number of plurality of clusters i.e. newly formed groups.

The number (k) of the plurality of clusters is lower than a number of the plurality of users and lower than a number of the plurality of groups i.e. k<<m, n.

In an embodiment, the second matrix and the third matrix are generated based on the relational structure between first mapping information and the second mapping information. In particular, the first mapping information is used to generate the matrix X, and the second mapping information is utilized how to determine the matrix W and matrix H from matrix X. In an embodiment, each existing group can be presented as a linear combination of plurality of clusters.

In order to generate second matrix (W) and the third matrix (H) from the first matrix (X), matrix factorization algorithms are applied. The matrix factorization techniques utilize the first mapping information and the second mapping information to generate the second and third matrixes from the first matrix. In particular, a relational structure between the first mapping information and the second mapping information is processed to generate the second and third matrixes using matrix factorization techniques. These techniques decompose a large matrix into smaller matrices that, when multiplied, reconstruct the original. The matrix factorization algorithms can include binary matrix factorization (BMF) such as penalty function algorithm and thresholding algorithm, Non-negative Matrix Factorization (NMF), etc. Thus, the plurality of clusters i.e. newly formed groups are generated to replace the existing grouping structure.

Method-II

In this method, to generate a cluster dataset for the plurality of clusters, the group optimization module 220 may minimize the number of groups for a given user instead of determining a smaller number of groups across the enterprise. The group optimization module 220 may determine a relational structure between the first mapping and the second mapping, and the determined relational structure between the first mapping information and the second mapping information may be processed to generate the cluster dataset. In particular, for a given user, the group optimization module 220 may identify all the data objects that the user has access to, based on the second mapping information. Once all the data objects accessible to the user are identified, the group optimization module 220 may determine the smallest subset of existing groups belonging to the user while retaining the same user permissions to all the data objects the user currently has access, i.e., processing of the relational structure between the first mapping information and the second mapping information. In this case, the user could be removed from any groups that are not part of this "minimal set cover" without impacting permissions. In an embodiment, the users are selected randomly to minimize the number of groups. In another embodiment, the users are selected based on one or more access metrics as described below in detail. The determining of the smallest subset of existing groups is performed for each user in a consecutive manner. For instance, once the smallest subset of the selected user is identified, the same process is repeated for the next user until all users are processed. The minimization of the number of groups can be identified using set cover algorithms. In this method-II, as well, each existing group can be represented as a linear combination of the plurality of clusters.

In an embodiment, when no satisfactory small subset of existing groups can be determined, the group optimization module 220 may determine a smaller subset by minimizing the impact on the user's permissions. In other words, the user might lose access to a set of files but the algorithm will minimize the amount of such loss. This can be formulated as a minimum k-union problem. In this manner, the group optimization module 220 may minimize the number of groups with which each of the plurality of users is associated. Thus, the plurality of clusters (i.e., newly formed groups) are generated to replace the existing grouping structure.

In an embodiment, in order to generate a cluster dataset, the group optimization module 220 may compute one or more access metrics based on the user data and the access data. The one or more access metrics pertain to relationships among the plurality of users, the plurality of groups, and the plurality of data objects. In other words, each access metric corresponds to a relationship between at least two types of elements such as group and user; group and data object; and data object and user. For example, user reach—a number (or proportion) of data objects that a given user has permission to access. The user reach defines a relation between data objects and users.

In an embodiment, to compute the one or more access metrics, the group optimization module 220 may compute one or more of—data object metrics associated with each of the plurality of objects, user metrics associated with each of the plurality of users, and group metrics associated with each of the plurality of users, based on the user data and access data. In some embodiments, group optimization module 220 can use the first mapping information the second mapping information, and the hypergraph to compute the one or more access metrics. The data object metrics can include one or more of data object exposure, data object popularity, and VE Ratio.

Data object exposure—a number (or proportion) of users who have access to a particular data object.

Data object popularity—a number (or proportion) of users who have accessed the data object in a given window of time.

View-to-Edit (VE) Ratio—a number of times the data object has been accessed/a number of edits made to the data object over a time window. The data objects with high VE ratios are information sources, ones with low VE ratios are information sinks (archives).

In an embodiment, the user metrics can include one or more of: user reach, user access utilization, and View-to-Edit (VE) Ratio.

User reach—a number (or proportion) of data objects that a given user has permission to access, i.e., a number of data objects, among the plurality of data objects, that a user can access to.

User access utilization—a number (or proportion) of data objects that a given user has accessed in a window of time.

VE Ratio—a number of views/number of edits by a given user, this can discriminate between information producers and information consumers.

In an embodiment, the group metrics can include one or more of: group reach, group utilization, group exclusivity, and group activity uniqueness.

Group reach—a number of users in the group or a number of files the group can access. In other words, the group reach indicates a number of users within a corresponding group among the plurality of groups or a number of data objects the group can access.

Group access utilization—a ratio of number of user-file pairs that had activity over a given time window to the group reach.

Group exclusivity—
a number of files that can be accessed if and only if membership in group G is true (excluding children of G), expressed as a proportion of all files accessible with membership in group G, or
For a given file that group G grants access to, there may be some users who are not members of group G but can still access the file. Compute the proportion of all users who have access to that file who are also members of group G. Average this number across all files group G grants access to.

Group activity uniqueness—a score that indicates if the activity of users who are members of group G is statistically different from the activity of users who are not members of group G.

In an embodiment, the group optimization module 220 may combine these various metrics to get a comprehensive view of data access and usage in order to restructure the grouping between users. For example, the group optimization module may determine the correlation between various metrics to identify potential targets (also referred to as "priority elements") for optimization of the user grouping, such as—

Sensitive files with high exposure and low popularity are good selections for group optimization. If a data object can be accessed by a lot of users but is accessed by a few users, then such data object may be prioritized for audits and tightening access permissions. This indicates that permissions for a number of users not actively accessing the files can be removed, thereby reducing the risk surface without affecting business continuity.

Users with high reach but low utilization show they likely have access to a large number of files but their roles require them to actively access only a small subset of them. Such users can be the top priority elements to be selected for the group optimization.

Groups with high reach and low utilization are also elements for group optimization—both in terms of the users who belong to the groups as well as files that are granted permissions because of group membership.

Data objects that are accessed frequently but have broad access permissions may need immediate attention to ensure they are secure.

Data objects with limited or outdated access might be deprioritized or even archived.

Thus, based at least on the one or more access metrics, one or more priority elements are identified. Based on the priority elements, the group optimization module 220 may select at least one of: a first set of groups among the plurality of groups, a first set of users among the plurality of users, and a first set of data objects among the plurality of data objects. In an embodiment, in order to select a first set of groups and/or a first set of users and/or a first set of data objects, the object optimization module may compare each metric with a respective predetermined threshold. In an example, the group reach may be compared with a group reach threshold, whereas the user reach may be compared with a user reach threshold. Thus, when an access metric crosses the corresponding predetermined threshold i.e. not within the predefined range, the corresponding group/user/data object may be selected as a top priority in the generation of the cluster dataset. In another embodiment, the two or more access metrics are combinedly analyzed to determine the priority elements. In case when two access metrics are not within the predefined range, these access metrics can be selected to determine the priority elements. For example, user reach and user access utilization are combinedly to determine "users with high reach but low utilization". Thus, the first set of groups is selected among the plurality of groups, the first set of users is selected among the plurality of users, and the first set of data objects among the plurality of data objects.

Thus, based on the access metrics, one or more insights are generated to decide where to focus permission audits, i.e., which groups/users/data objects are prioritized to generate the new groups, which involve reviewing who has access to what data and whether those permissions are still appropriate.

After identifying priority elements, i.e., areas that need attention, the group optimization module 220 may generate the cluster dataset while accounting the first mapping information and the second mapping information along with the selected users/groups/data objects. The users, groups, and data objects can be selected in any combination based on the comparison. In the process of the generation of the cluster dataset, the existing grouping structure is replaced by a new grouping structure defined by the plurality of clusters. Thus, restructuring the grouping of the users can remove unnecessary groups to better align with actual usage patterns. Moreover, it can reduce security risks and improve data governance.

Thus, server system 200 can restructure the grouping of the users within the enterprises. Restructuring user groups ensures that users have access only to the resources they need, thereby reducing over-privileged access. This limits the organization's exposure to potential security breaches and insider threats. Moreover, by optimizing the group structure, organizations can maintain tighter control over sensitive data, ensuring that only the authorized users or teams have access to particular information, files, or systems.

In addition, well-structured group facilitates easier tracking of user permissions and data access patterns. Moreover, optimizing user groups ensures that existing permissions are retained where necessary, avoiding the risk of disrupting business activities while still allowing for more efficient management of access. This ensures continuity without impacting day-to-day operations.

In an embodiment, the display management module 222 is configured to display the set of data objects such as documents according to the access request. Further, the display management module 222 is also configured to display a message indicating whether the user is allowed to access the document.

Although FIG. 2 shows the hardware elements of the server system 200, it is to be understood that other embodiments are not limited thereon. In other embodiments, the server system 200 may include fewer or more number of elements. Further, the labels or names of the elements are used only for illustrative purposes and do not limit the scope of the invention. One or more components can be combined to perform the same or substantially similar function.

Figure 3:
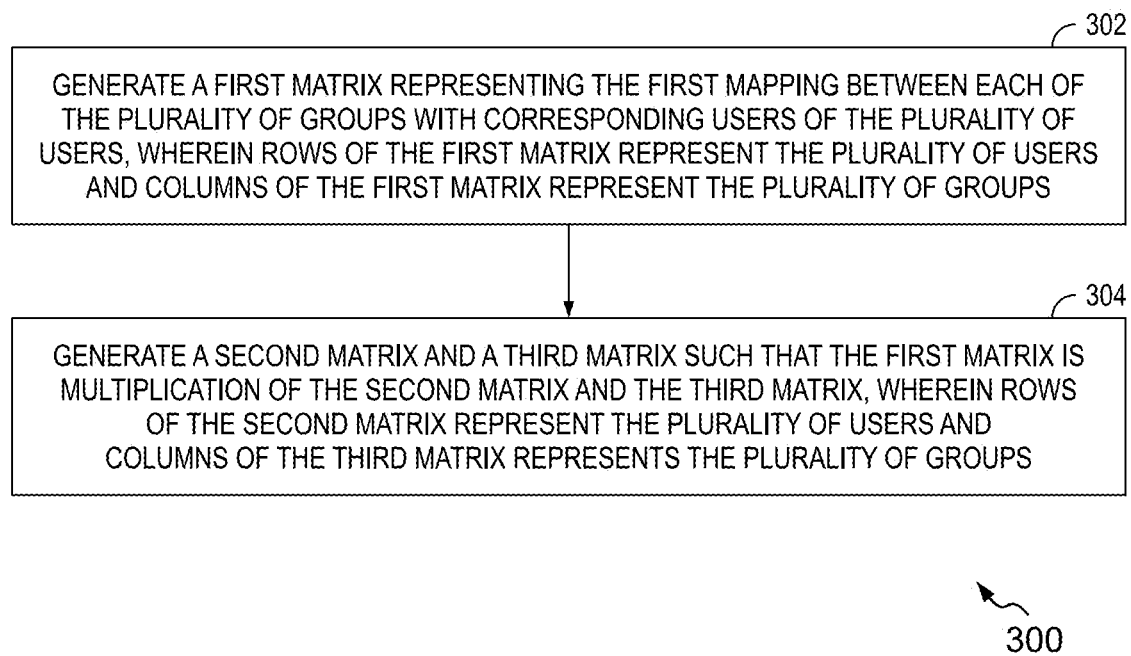
FIG. 3 illustrates a flow chart illustrating a method for generating a cluster dataset representing a plurality of clusters based on first mapping information and the second mapping information, in accordance with an embodiment of the present disclosure.

FIG. 3 illustrates a flow chart illustrating a method 300 for generating a cluster dataset representing a plurality of clusters based on first mapping information and the second mapping information, in accordance with an embodiment of the present disclosure. The server system 118 is described with reference to FIG. 1. Operations of the method 300, and combinations of the operations in the method 300, may be implemented by, for example, hardware, firmware, a processor, circuitry, and/or a different device associated with the execution of software that includes one or more computer program instructions. The sequence of operations of the method 300 may not be necessarily executed in the same order as they are presented. Further, one or more operations may be grouped and performed in the form of a single step, or one operation may have several sub-steps that may be performed in parallel or a sequential manner.

The method 300 for generating a cluster dataset representing a plurality of clusters is performed according to method-I as described above with reference to FIG. 2. The method 300 describes a method for generation of a cluster dataset representing a plurality of clusters, i.e., newly formed groups to replace existing grouping structure. The method 300 starts with step 302.

At step 302, the server system 118 may generate a first matrix representing the first mapping information between each of the plurality of groups with corresponding users of the plurality of users. The rows of the first matrix represent the plurality of users and columns of the first matrix represent the plurality of groups. The first matrix can be a binary matrix. When the user belongs to the group, the value of the corresponding cell of the first matrix is 1, otherwise, the value of the cell of the first matrix is 0. The first matrix is an adjacency matrix representing group membership information i.e. all the users associated with each group.

At step 304, the server system 118 may generate a cluster dataset including a second matrix (W) and a third matrix (H) such that the first matrix is multiplication of the second and the third matrixes while maintaining the same access information for the plurality of users as it was with the plurality of groups (existing groups). The rows of the second matrix represent the plurality of users, whereas the number (n) of columns of the third matrix represents a number of the plurality of groups.

The second matrix (W) and the third matrix (H) are also binary matrixes. The number of columns of the second matrix (W) or a number of rows of the third matrix (H) represents a number (k) of plurality of clusters. The number (k) of the plurality of clusters is lower than a number of the plurality of users and lower than a number of plurality of groups i.e. k<<m, n.

In an embodiment, the second matrix and the third matrix are generated based on the first mapping information and the second mapping information. In particular, the first mapping information is used to generate the matrix X, and the second mapping information is utilized how to determine the matrix W and matrix H from matrix X. In other words, the second mapping information may be used to determine the number (k), i.e., the number of plurality of clusters. Each existing group can be presented as a linear combination of the plurality of clusters.

Thus, the columns of matrix W represent the generated plurality of clusters and rows of the matrix W represent the corresponding users. Each cell in the matrix corresponds to a specific user-group pairing. The value of the cell indicates whether a particular user is a member of a specific cluster. This matrix allows easy identification of user memberships across multiple clusters. If a user has multiple clusters they belong to, their corresponding row will have multiple positive cell values.

For example:
A cell value of 1 (or true) might indicate that the user belongs to the group.
A cell value of 0 (or false) would indicate that the user is not part of that group.

An exemplary representation of the second matrix (W)—

$$W = \begin{pmatrix} 1 & 0 & 1 \\ 0 & 0 & 1 \\ 1 & 1 & 0 \end{pmatrix}$$

In this example, second matrix (W) indicates that there are three newly formed groups and there are 3 users. The first user represented by the first row belongs to the groups 1 and 3, the second user belongs to third group, and the third user belongs to the first and second groups.

In order to generate the second matrix (W) and the third matrix (H) from the first matrix (X), matrix factorization algorithms are applied. The matrix factorization techniques utilize the first mapping information and the second mapping information to generate the second and third matrixes from the first matrix. In some cases, the matrix factorization techniques utilize the priority elements as described above along with the first and second mapping information to generate second and third matrixes. These techniques decompose a large matrix into smaller matrices that, when multiplied, reconstruct the original. The matrix factorization algorithms can include binary matrix factorization (BMF) such as penalty function algorithm and thresholding algorithm, Non-negative Matrix Factorization (NMF), etc. Thus, the plurality of clusters, i.e., newly formed groups are generated to replace the existing grouping structure within the enterprise.

FIG. 4A illustrates a graphical representation of a hypergraph generated based on the user data and the access data, in accordance with embodiments of the present disclosure. FIGS. 4B-4C illustrate graphical representations of subgraph generated based on the hypergraph as shown in FIG. 4A, in accordance with embodiments of the present disclosure.

FIGS. 4A-4C depict hypergraphs and subgraphs that can assist in determining the first mapping information, i.e., mapping between the plurality of users and the plurality of groups and the second mapping information, i.e., mapping between the plurality of users and the plurality of data objects. As shown in FIG. 4, each of the plurality of groups can be represented by a group node such as 401-1, 401-2, 401-3 and each of the plurality of users can be represented by a user node such as 402-1, 402-2, 402-3. Similarly, each of the plurality of data objects can be represented by a data object node such as 403-1, 403-2, and 403-3.

In an embodiment, the edges between the users and group can be referred to as membership edges 411, which can indicate a first mapping information between each of the plurality of groups with corresponding associated users of the plurality of users. The membership edge can be set based on the user data. Similarly, if the data object can be accessed through a user, the data object may be connected to all the users that can access the data object, via edges 412. The edge between the user and the data object can be referred to as permission edges 412, which can indicate a second mapping information between each of the plurality of data objects with corresponding associated users of the plurality of users.

Thus, the hypergraph identifies the relationship between the user and the group, and the relationship between the user and the data object. In other words, the hypergraph indicates a direct relationship among users, groups, and data objects. The hypergraph can be used to unroll the relationship between the users and groups as well as the relationship between the users and the data objects, which helps to determine the first mapping information and the second mapping information.

In order to determine the first mapping information and the second mapping information, a subgraph may be selected from the hypergraph. A subgraph refers to a smaller, more specific subset of the larger hypergraph, containing some of the original vertices and edges. In order to determine the first mapping information or the user-group mapping, a subgraph 450 may be selected within the hypergraph, which, for example, represents a subset of users 402-2 and 402-3 belonging to a specific group 401-3, as well as the relationships (connections) between them as shown in FIG. 4B. Thus, for each of the plurality of groups, one subgraph may be retrieved from the hypergraph, and membership edges in the corresponding subgraph indicate the users associated with the group, thereby determining the first mapping information.

In the same manner, to determine the second mapping information, i.e., user-data object mapping, a subgraph 460 may be selected within the hypergraph, which, for example, represents a subset of data objects 403-1 and 403-2 accessible to a specific user 401-1, as well as the relationships (connections) between them as shown in FIG. 4C. Thus, for each of the plurality of users, one subgraph may be retrieved from the hypergraph, and permission edges in the corresponding subgraph indicate the data objects associated with the user, thereby determining the second mapping information.

Figure 5:
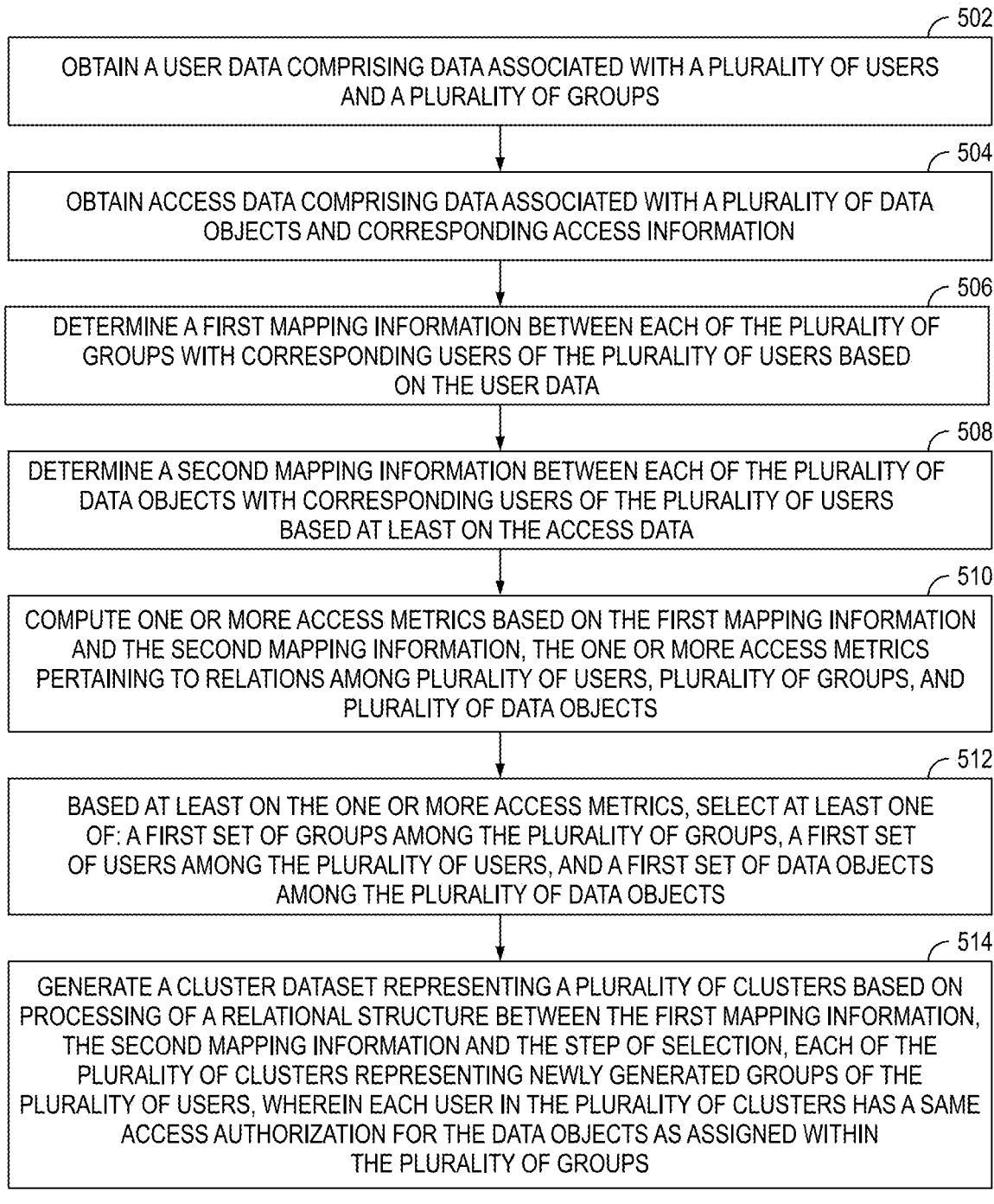
FIG. 5 is a flow diagram of a computer-implemented method for optimizing grouping to enhance access control and mitigate security risks, in accordance with an embodiment of the present disclosure.

FIG. 5 is a flow diagram of a computer-implemented method 500 for optimizing grouping to enhance access control and mitigate security risks, in accordance with an embodiment of the present disclosure. The method 500 depicted in the flow diagram may be executed by, for example, the at least one server system such as the server system 118. Operations of the flow diagram of the method 500, and combinations of operations in the flow diagram of the method 500, may be implemented by, for example, hardware, firmware, a processor, circuitry, and/or a different device associated with the execution of software that includes one or more computer program instructions. The method 500 starts at operation 502.

At 502, the method 500 includes obtaining user data, where the user data includes data associated with a plurality of users and a plurality of groups. Each of the plurality of users is associated with at least one group of the plurality of groups. The user data specifies a group membership of each of the plurality of users and one or more of the plurality of groups.

At 504, the method 500 includes obtaining access data, where the access data includes data associated with a plurality of data objects and corresponding access information. The access information specifies a set of users or groups, from the plurality of users or the plurality of groups, authorized to access each respective data object of the plurality of data objects.

At 506, the method 500 includes determining a first mapping information between each of the plurality of groups with corresponding users of the plurality of users based on the user data.

At 508, the method 500 includes determining a second mapping information between each of the plurality of data objects with corresponding users of the plurality of users based on the access data.

At 510, the method 500 includes computing one or more access metrics based on the user data and the access data.

The one or more access metric pertains to relations among the plurality of users, the plurality of groups, and the plurality of data objects.

At 512, the method 500 includes selecting at least one of: a first set of groups among the plurality of groups, a first set of users among the plurality of users, and a first set of data objects among the plurality of data objects, based at least on the one or more access metrics. The step of selecting comprises comparing each of the group metrics, the user metrics, and the data object metrics with a respective predetermined threshold. The selecting further comprises selecting at least one of first set of groups/users/data objects based on the comparison.

At 514, the method 500 includes generating a cluster dataset representing a plurality of clusters based on processing of a relational structure between the first mapping information, the second mapping information and the step of selection. In case of method-I, the matrix factorization algorithms can utilize the selected elements such as first set of groups/users/data objects, to generate the second and third matrixes. The value of k, as shown in equations (2) and (3) is determined by prioritizing selected elements—groups/users/data objects in generation of the cluster dataset.

In case of method-II, the selected users are prioritized to generate the smallest subset of existing groups. Once the smallest subsets of existing groups of the selected users are generated, then less prioritized users are processed for the generation of the smallest subset of existing groups, thereby generating the plurality of clusters, i.e. newly generated groups.

The plurality of clusters represent newly generated groups of the plurality of users. Each user in the plurality of clusters has a same access authorization for the plurality of data objects as assigned within the plurality of groups. A number of the plurality of clusters is less than a number of the plurality of groups.

Figure 6:
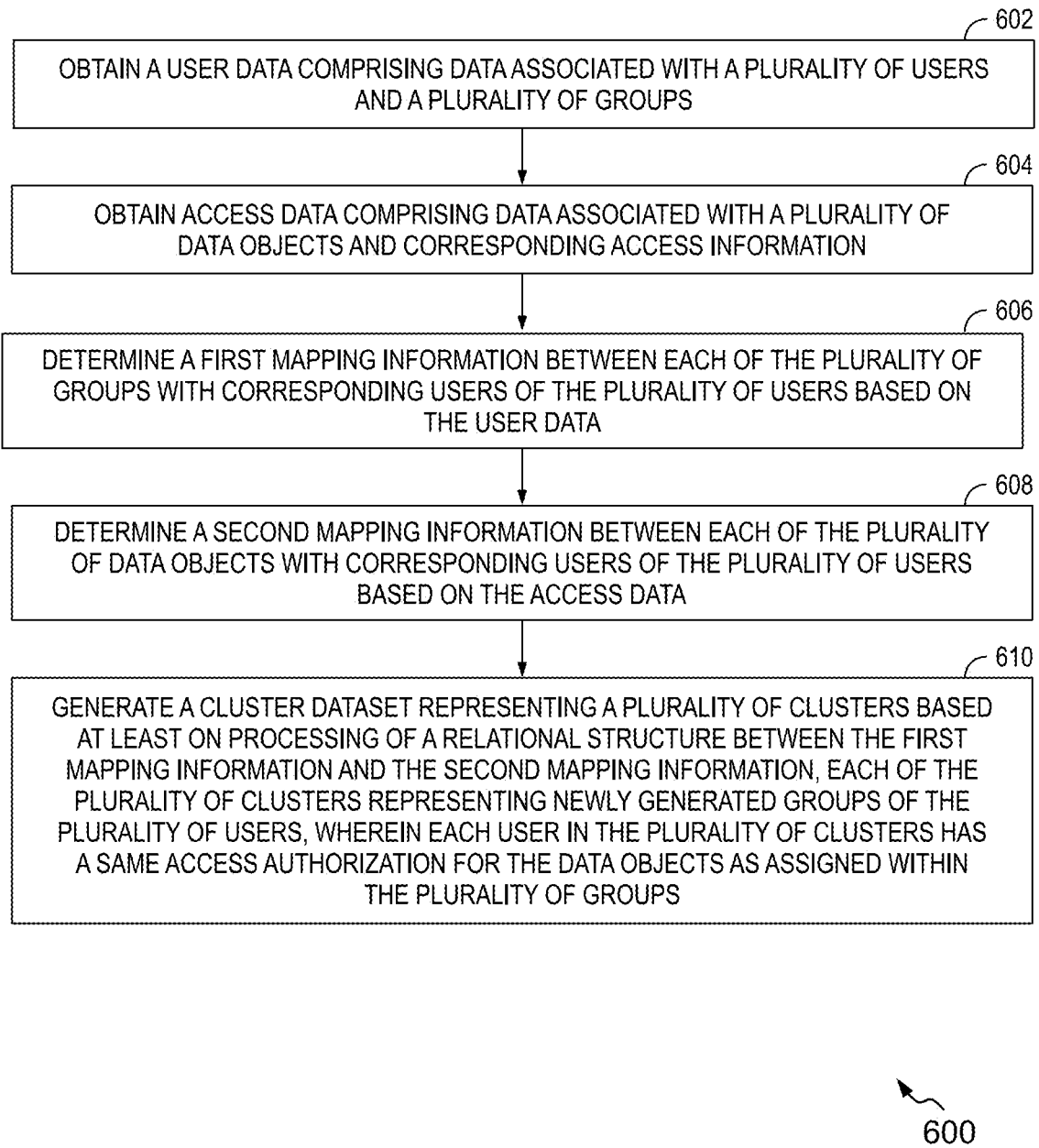
FIG. 6 is a flow diagram of a computer-implemented method for optimizing grouping to enhance access control and mitigate security risks, in accordance with another embodiment of the present disclosure.

FIG. 6 is a flow diagram of a computer-implemented method 600 for optimizing grouping to enhance access control and mitigate security risks, in accordance with another embodiment of the present disclosure. The method 600 depicted in the flow diagram may be executed by, for example, the at least one server system such as the server system 118. Operations of the flow diagram of the method 600, and combinations of operations in the flow diagram of the method 600, may be implemented by, for example, hardware, firmware, a processor, circuitry, and/or a different device associated with the execution of software that includes one or more computer program instructions. The method 600 starts at operation 602.

At 602, the method 600 includes obtaining user data, where the user data includes data associated with a plurality of users and a plurality of groups. Each of the plurality of users is associated with at least one group of the plurality of groups. The user data specifies a group membership of each of the plurality of users and one or more of the plurality of groups.

At 604, the method 600 includes obtaining access data, where the access data includes data associated with a plurality of data objects and corresponding access information. The access information specifies a set of users or groups, from the plurality of users or the plurality of groups, authorized to access each respective data object of the plurality of data objects.

At 606, the method 600 includes determining a first mapping information between each of the plurality of groups with corresponding users of the plurality of users based on the user data.

At 608, the method 600 includes determining a second mapping information between each of the plurality of data objects with corresponding users of the plurality of users based on the access data.

At 610, the method 600 includes generating a cluster dataset representing a plurality of clusters based at least on processing of a relational structure between the first mapping information and the second mapping information. The plurality of clusters represent newly generated groups of the plurality of users. Each user in the plurality of clusters has a same access authorization for the plurality of data objects as assigned within the plurality of groups. A number of the plurality of clusters is less than a number of the plurality of groups.

Figure 7:
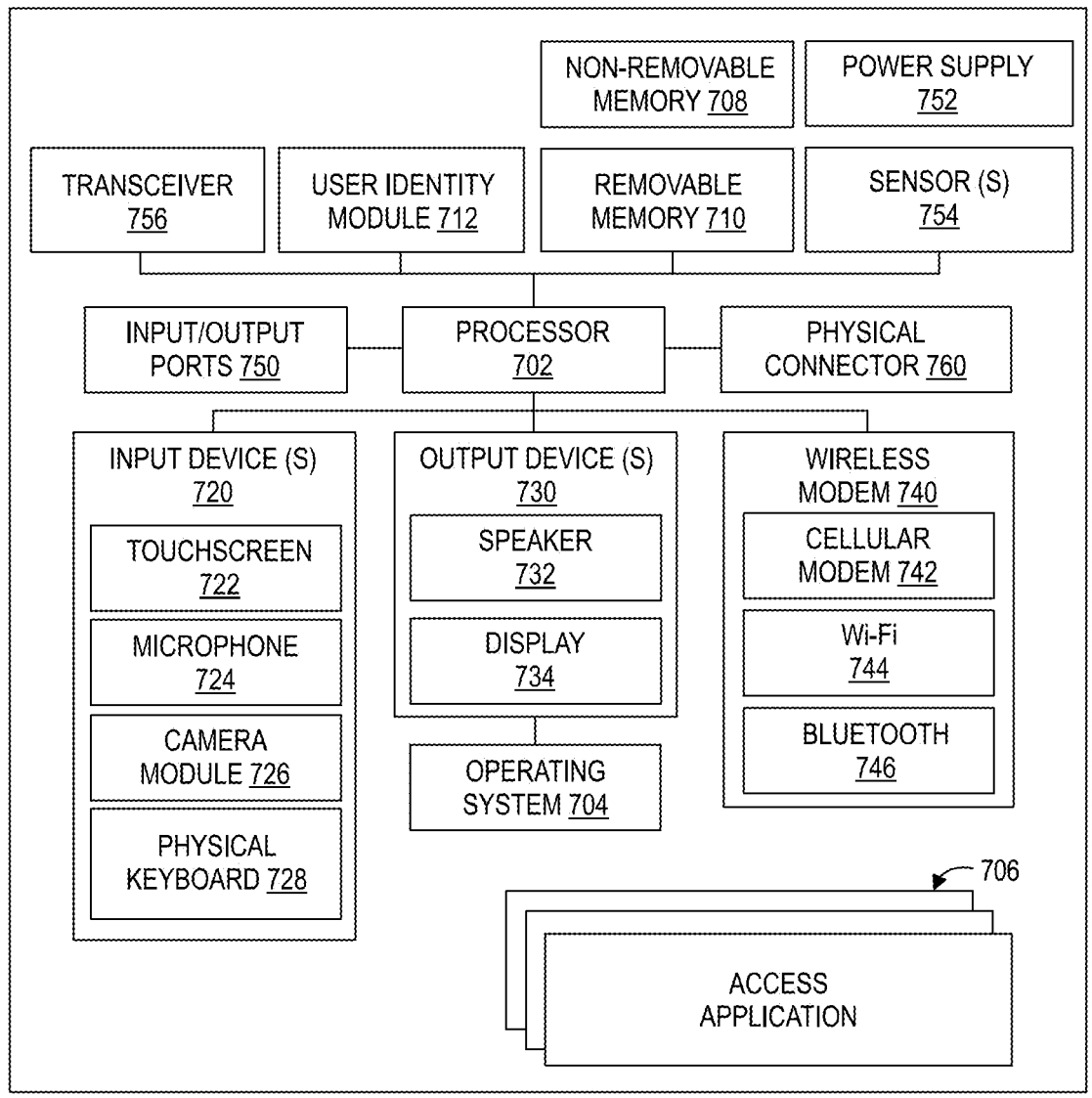
FIG. 7 is a simplified block diagram of a user device, in accordance with various embodiments of the present disclosure.

FIG. 7 is a simplified block diagram of a user device 700 for example, a mobile phone or a desktop computer capable of implementing the various embodiments of the present disclosure. For example, the user device 700 may correspond to the user devices 102-108 of FIG. 1. The user device 700 is depicted to include one or more applications, such as an access application 706 facilitated by the server system 118. The access application 706 can be an instance of an application downloaded from the server system 118 or a third-party server. The access application 706 is capable of communicating with the server system 118 for optimizing user grouping shown in FIG. 1.

It should be understood that the user device 700 as illustrated and hereinafter described is merely illustrative of one type of device and should not be taken to limit the scope of the embodiments. As such, it should be appreciated that at least some of the components described below in connection with the user device 700 may be optional, and thus in an example embodiment may include more, less, or different components than those described in connection with the example embodiment of FIG. 7. As such, among other examples, the user device 700 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 700 includes a controller or a processor 702 (e.g., a signal processor, microprocessor, ASIC, or other control, and processing logic circuitry) for performing such tasks as signal coding, data processing, image processing, input/output processing, power control, and/or other functions. An operating system 704 controls the allocation and usage of the components of the user device 700 and supports one or more application programs, such as the access application 706, that implements one or more of the innovative features described herein. In addition to the access application 706, the applications may include common mobile computing applications (e.g., telephony applications, email applications, calendars, contact managers, web browsers, and messaging applications) or any other computing application.

The illustrated user device 700 includes one or more memory components, for example, a non-removable memory 708 and/or a removable memory 710. The non-removable memory 708 and the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the access application 706. The user device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in the form of the SIM card is well known in Global Systems for Mobile (GSM) communication systems, Code Division Multiple Access (CDMA) systems, or third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 700 can support one or more input devices 720 (hereinafter referred to as "input devices") and one or more output devices 730 (hereinafter referred to as "output devices"). Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device, or a local wireless data network or router, and/or a Bluetooth-compatible modem 746. The wireless modem 740 is typically configured for communication with one or more cellular networks, such as a GSM network for data and voice communications within a single cellular network, between cellular networks, or between the user device 700 and a public switched telephone network (PSTN).

The user device 700 can further include one or more input/output ports 750, a power supply 752, one or more sensors 754 (e.g., an accelerometer, a gyroscope, a compass, or an infrared proximity sensor) for detecting the orientation or motion of the user device 700 and biometric sensors for scanning biometric identity of an authorized user, a transceiver 756 (for wirelessly transmitting analog or digital signals) and/or a physical connector 760, which can be a USB port, IEEE 794 (FireWire) port, and/or RS-232 port. The illustrated components are not required or all-inclusive, as any of the components shown can be deleted and other components can be added.

The disclosed methods 300, 500, and 600, or one or more operations of these methods may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Particularly, the server system 118 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for optimizing grouping for enhanced access control and risk mitigation, the method comprising:
   obtaining, by a server system, user data comprising data associated with a plurality of users and a plurality of groups, wherein each of the plurality of users is associated with at least one group of the plurality of groups, wherein the user data specifies a group membership of each of the plurality of users and one or more of the plurality of groups;
   obtaining, by the server system, access data comprising data associated with a plurality of data objects and corresponding access information, wherein the access information specifies a set of users or groups, from the plurality of users or the plurality of groups respectively, authorized to access each respective data object of the plurality of data objects;
   determining, by the server system, a first mapping information between each of the plurality of groups with corresponding users of the plurality of users based on the user data;
   determining, by the server system, a second mapping information between each of the plurality of data objects with corresponding users of the plurality of users based at least on the access data;
   generating, by the server system, a cluster dataset representing a plurality of clusters based at least on processing of a relational structure between the first mapping information and the second mapping information, the plurality of clusters representing newly generated groups of the plurality of users, wherein each user in the plurality of clusters has a same access authorization for the plurality of data objects as assigned within the plurality of groups, wherein a number of the plurality of clusters is less than a number of the plurality of groups; and
   replacing, by the server system, an existing grouping of the plurality of users with the generated cluster dataset.

2. The method as claimed in claim 1, wherein each of the plurality of groups is represented as a linear combination of one or more clusters of the plurality of clusters.

3. The method as claimed in claim 1, wherein the first mapping information and the second mapping information are determined through a hypergraph, the hypergraph indicating a relationship among the plurality of users, the plurality of groups, and the plurality of data objects.

4. The method as claimed in claim 1, further comprising:
   computing, by the server system, one or more access metrics based on the user data and the access data, the one or more access metrics pertaining to relations among the plurality of users, the plurality of groups, and the plurality of data objects; and
   based at least on the one or more access metrics, selecting, by the server system, at least one of: a first set of groups among the plurality of groups, a first set of users among the plurality of users, and a first set of data objects among the plurality of data objects, wherein the cluster dataset is generated further based on the selection.

5. The method as claimed in claim 4, wherein computing the one or more access metrics comprises computing one or more of data object metrics associated with each of the plurality of objects, user metrics associated with each of the plurality of users, and group metrics associated with each of the plurality of users.

6. The method as claimed in claim 5, wherein the data object metrics comprise one or more of: data object exposure, data object popularity, and View-to-Edit (VE) Ratio, wherein the user metrics comprise one or more of: user reach, user access utilization, and VE Ratio, and wherein the group metrics comprise one or more of: group reach, group utilization, group exclusivity, and group activity uniqueness.

7. The method as claimed in claim 6, wherein computing one or more access metrics comprises computing a user reach for each of the plurality of users and computing a group reach for each of the plurality of groups, the user reach indicating a number of data objects, among the plurality of data objects, that a user can access to and the group reach indicating a number of users within a corresponding group among the plurality of groups.

8. The method as claimed in claim 5, wherein the step of selecting comprises:
   comparing each of the group metrics, the user metrics, and the data object metrics with a respective predetermined threshold; and
   selecting at least one of following based on the comparison:
      the first set of groups among the plurality of groups,
      the first set of users among the plurality of users, and
      the first set of data objects among the plurality of data objects.

9. The method as claimed in claim 1, wherein generating the cluster dataset representing a plurality of clusters based at least on processing of the relational structure between the first mapping information and the second mapping information comprises:
   generating a first matrix representing the first mapping information between each of the plurality of groups with corresponding users of the plurality of users, wherein rows of the first matrix represent the plurality of users and columns of the first matrix represent the plurality of groups, and
   generating a second matrix and a third matrix such that the first matrix is multiplication of the second matrix and the third matrix, wherein rows of the second matrix represent the plurality of users and columns of the third matrix represent the plurality of groups,
   wherein the second matrix and the third matrix are generated based on the first mapping information and the second mapping information,
   wherein a number of columns of the second matrix or a number of rows of the third matrix represent a number of the plurality of clusters, wherein the number of the plurality of clusters is lower than a number of the plurality of users.

10. The method as claimed in claim 1, wherein generating the cluster dataset representing the plurality of clusters based at least on processing of the relational structure between the first mapping information and the second mapping information comprises:
  minimizing a number of groups with which each of the plurality of users is associated, wherein minimizing the number of groups comprises determining a smallest subset of groups associated with each of the plurality of users, and wherein the step of determining the smallest subset of groups is performed for each user in a consecutive manner.

11. A server system, the system comprising:
a memory configured to store instructions; and
a processor in communication with the memory, the processor configured to execute the instructions stored in the memory and thereby cause the server system to perform at least in part to:
  obtain user data comprising data associated with a plurality of users and a plurality of groups, wherein each of the plurality of users is associated with at least one group of the plurality of groups, wherein the user data specifies a group membership of each of the plurality of users and one or more of the plurality of groups;
  obtain access data comprising data associated with a plurality of data objects and corresponding access information, wherein the access information specifies a set of users or groups, from the plurality of users or the plurality of groups respectively, authorized to access each respective data object of the plurality of data objects;
  determine a first mapping information between each of the plurality of groups with corresponding users of the plurality of users based on the user data;
  determine a second mapping information between each of the plurality of data objects with corresponding users of the plurality of users based on the access data;
  generate a cluster dataset representing a plurality of clusters based at least on processing of a relational structure between the first mapping information and the second mapping information, the plurality of clusters representing newly generated groups of the plurality of users, wherein each user in the plurality of clusters has a same access authorization for the plurality of data objects as assigned within the plurality of groups, wherein a number of the plurality of clusters is less than a number of the plurality of groups; and
  replace an existing grouping of the plurality of users with the generated cluster dataset.

12. The system as claimed in claim 11, wherein each of the plurality of groups is represented as a linear combination of one or more clusters of the plurality of clusters.

13. The system as claimed in claim 11, wherein the first mapping information and the second mapping information are determined through a hypergraph, the hypergraph indicating a relationship among the plurality of users, the plurality of groups, and the plurality of data objects.

14. The system as claimed in claim 11, wherein the processor is further configured to:
  compute one or more access metrics based on the user data and the access data, the one or more access metrics pertaining to relations among the plurality of users, the plurality of groups, and the plurality of data objects; and
  based at least on the one or more access metrics, select at least one of: a first set of groups among the plurality of groups, a first set of users among the plurality of users, and a first set of data objects among the plurality of data objects,
  wherein the cluster dataset is generated further based on the selection.

15. The system as claimed in claim 14, wherein to compute the one or more access metrics, the processor is configured to compute one or more of data object metrics associated with each of the plurality of objects, user metrics associated with each of the plurality of users, and group metrics associated with each of the plurality of users.

16. The system as claimed in claim 15, wherein the data object metrics comprise one or more of: data object exposure, data object popularity, and View-to-Edit (VE) Ratio, wherein the user metrics comprise one or more of: user reach, user access utilization, and VE Ratio, and wherein the group metrics comprise one or more of: group reach, group utilization, group exclusivity, and group activity uniqueness.

17. The system as claimed in claim 16, wherein, to compute the one or more access metrics, the processor is configured to compute a user reach for each of the plurality of users and compute a group reach for each of the plurality of groups, the user reach indicating a number of data objects, among the plurality of data objects, that a user can access to and the group reach indicating a number of users within a corresponding group among the plurality of groups.

18. The system as claimed in claim 15, wherein, the processor is configured to:
  compare each of the group metrics, the user metrics, and the data object metrics with a respective predetermined threshold; and
  select at least one of following based on the comparison:
    the first set of groups among the plurality of groups,
    the first set of users among the plurality of users, and
    the first set of data objects among the plurality of data objects.

19. The system as claimed in claim 11, wherein to generate the cluster dataset representing a plurality of clusters based at least on processing of the relational structure between the first mapping information and the second mapping information, the processor is configured to:
  generate a first matrix representing the first mapping information between each of the plurality of groups with corresponding users of the plurality of users, wherein rows of the first matrix represent the plurality of users and columns of the first matrix represent the plurality of groups,
  generate a second matrix and a third matrix such that the first matrix is multiplication of the second matrix and the third matrix, wherein rows of the second matrix represent the plurality of users and columns of the third matrix represent the plurality of groups,
  wherein the second matrix and the third matrix are generated based on the first mapping information and the second mapping information,
  wherein a number of columns of the second matrix or a number of rows of the third matrix represent a number of the plurality of clusters, wherein the number of the plurality of clusters is lower than a number of the plurality of users.

20. The system as claimed in claim 11, wherein to generate the cluster dataset representing the plurality of clusters based at least on processing of the relational structure between the first mapping information and the second mapping information, the processor is configured to:
  minimize a number of groups with which each of the plurality of users is associated, wherein to minimize the number of groups, the processor is configured to determine a smallest subset of groups associated with each of the plurality of users, and wherein the determination of the smallest subset of groups is performed for each user in a consecutive manner.

* * * * *